(12) United States Patent
Chang

(10) Patent No.: US 8,503,150 B2
(45) Date of Patent: Aug. 6, 2013

(54) ELECTRICAL INTERFACE PROTECTING APPARATUS

(75) Inventor: Pak Chuen Chang, Kuantan (MY)

(73) Assignee: Universiti Malaysia Pahang, Pahang (MY)

( * ) Notice: Subject to any disclaimer, the term of this patent is extended or adjusted under 35 U.S.C. 154(b) by 81 days.

(21) Appl. No.: 12/921,576

(22) PCT Filed: Feb. 11, 2009

(86) PCT No.: PCT/MY2009/000026
§ 371 (c)(1),
(2), (4) Date: Sep. 9, 2010

(87) PCT Pub. No.: WO2009/116849
PCT Pub. Date: Sep. 24, 2009

(65) Prior Publication Data
US 2011/0007444 A1    Jan. 13, 2011

(30) Foreign Application Priority Data
Mar. 17, 2008 (MY) ............. PI 20080707

(51) Int. Cl.
*H01C 7/12* (2006.01)

(52) U.S. Cl.
USPC .................................. 361/117; 361/118

(58) Field of Classification Search
USPC ........................................ 361/117–119
See application file for complete search history.

(56) References Cited

U.S. PATENT DOCUMENTS

| | | | |
|---|---|---|---|
| 4,901,183 A * | 2/1990 | Lee | 361/56 |
| 5,625,521 A * | 4/1997 | Luu | 361/111 |
| 6,252,754 B1 * | 6/2001 | Chaudhry | 361/111 |
| 6,661,634 B2 * | 12/2003 | Roberts et al. | 361/119 |

* cited by examiner

*Primary Examiner* — Danny Nguyen
(74) *Attorney, Agent, or Firm* — Raj Abhyanker, P.C.

(57) ABSTRACT

The electrical interface protecting apparatus is coupled between the wall-outlet and connected equipment to solve the difficulty of keeping broadband over power line modems and connected equipment safe from lightning and power surges while at the same time functioning effectively. The apparatus includes a low pass filter to prevent symmetrical signals from being attenuated and also an electromagnetic interference filter to provide clean and safe power at another outlet while preventing noise generated by connected equipment from being injected into the power line. It also provides a grounding means which reduces the leakage current flowing into the earth ground.

14 Claims, 1 Drawing Sheet

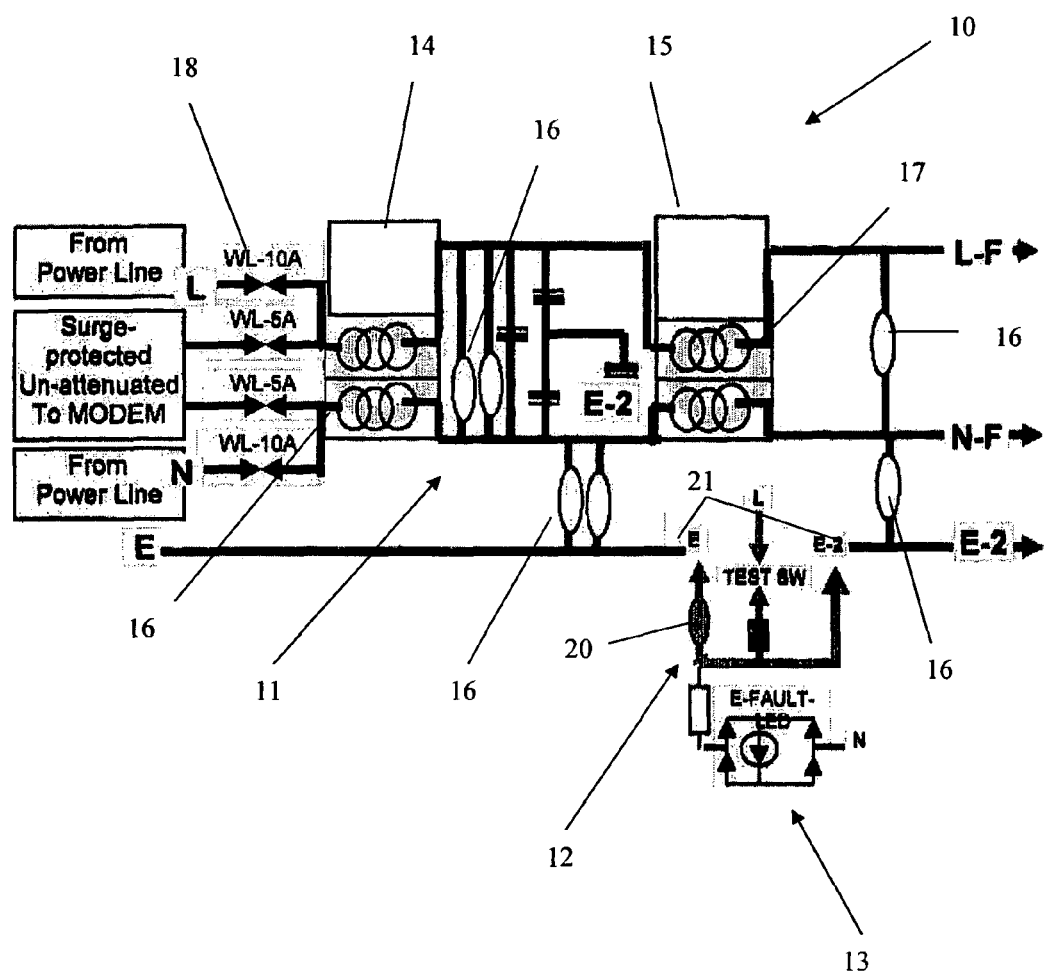

ELECTRICAL INTERFACE PROTECTING APPARATUS

FIELD OF INVENTION

The present invention relates generally to an electrical protection apparatus and more particularly to an electrical interface protecting apparatus for protecting electrical loads from lightning and voltage surges.

BACKGROUND OF THE INVENTION

Over-voltage peaks on conductors which lead into connected equipments can happen due to various events like naturally occurring phenomenon, such as lightning strikes during thunderstorms, which induce power surges in the power lines or by man-made causes such as sudden variations in the power provided at the output due to failures of components or even occasional short circuits. Such surges can cause permanent damage to electrical equipment connected to the power line and also present great threats to human safety.

As far as concerned, the greatest problem with residual current device (RCD) is nuisance tripping of the earth leakage circuit breaker (ELCB) which is either due to the design of the RCD or due to the installation. Nuisance tripping is frequently caused by equipment leakage current or earth-potential rise (ERP) caused by lightning or high-current discharge to earth-ground. Another problem faced by the users of these equipment is that the sum-total of each legally allowed leakage current limit per connected equipment can add up to a value near the trip-threshold current, of 15 mA to 30 mA, making the ELCB or RCD nuisance-trip at the slightest addition of leakage-current.

Also, for the broadband over power line (BPL) that allows Internet data to be transmitted over utility power lines, the subscriber has to install a modem that plugs into a wall outlet. A modem surge protector is needed to protect the modem and connected computer from surges of current. However, when the modem is connected via a surge protector, they cannot function effectively with the surge protector that attenuates the data signals and if there is too high noise level or radio frequency interference (RFI) being injected into the power line.

In the present invention, a lightning and surge protection device is a safe power interface that provides minimum attenuation to data signals at one safe outlet and provides safe power for all the connected equipment via another outlet, and at the same time equipment noise is prevented from being injected into the power line. The device has an interface circuit that reduces the chances of nuisance tripping of ELCB or RCD, that are due to accumulation of leakage currents from the connected equipment.

SUMMARY OF THE INVENTION

In the present invention, an electrical interface protecting means for protecting electrical equipment from a power surge or lightning, comprising a first current limiting component connected in series between a first input means and a first output means, a second current limiting component connected in series between a second input means and a second output means, a first filter circuit connected to the first and second output means, that reduces electrical noise interference without attenuating the signals to one outlet, and a second filter circuit connected between the outlet and the electrical equipment, that filters electrical noise interference generated by the connected equipment from flowing into the electrical connection.

Preferably the means further comprising a semi-floating equipment ground means coupled to the means, that reduces the leakage current of the connected equipment from flowing into earth ground and keeps the leakage current level below the trip threshold current of earth leakage circuit breaker.

Preferably the first filter circuit is a low pass filter which includes a set of choke coils arranged in-phase on a magnetic core that presents high impedance to prevent attenuation of symmetrical high frequencies of data signals and provide low impedance to asymmetrical radio frequency interference noise to be attenuated at the low pass L-C filter.

Preferably the second filter circuit is an electromagnetic interference filter which includes a set of choke coils arranged out-of-phase on a magnetic core together with the L-C filter to allow both symmetrical and asymmetrical RFI which are generated by the connected equipment to be attenuated and prevent them from injected into the power lines.

BRIEF DESCRIPTION OF THE DRAWINGS

Other objects, features, and advantages of the invention will be apparent from the following description when read with reference to the accompanying drawings. In the drawings, wherein like reference numerals denote corresponding parts throughout the several views:

FIG. 1 shows an electrical interface protecting circuit in accordance to the present invention.

DETAILED DESCRIPTION OF THE PREFERRED EMBODIMENTS

In the following detailed description, numerous specific details are set forth in order to provide a thorough understanding of the invention. However, it will be understood by those or ordinary skill in the art that the invention may be practiced without these specific details. In other instances, well-known methods, procedures and/or components have not been described in detail so as not to obscure the invention. Reference will now be made in detail to the preferred embodiments of the present invention, examples of which are illustrated in the accompanying drawings.

Referring now to FIG. 1, there is shown an arrangement in accordance with a preferred embodiment of this invention, suitable for connection between the electrical energy supply cable or connection means such as a wall outlet and the input of an equipment for keeping it safe from lightning and power surges while at the same time functions effectively, generally designated by the numeral 10. The interface protection circuit (10) includes a filter circuit (11), a grounding means (12), and a detection circuit (13).

The filter circuit (11) includes at least one current limiting component (18) which can be selected at any appropriate rating and acceptable for normal operation of the equipment such as 5-Amperes or 10-Amperes with thermal fuses or the likes between the electrical energy supply connection of the line and neutral terminals and the input of the interface protection circuit (10). The filter circuit (11) further comprises of a low pass filter (14) at the first filter stage and an electromagnetic interference (EMI) filter (15) at the second filter stage and connected therebetween.

The low pass filter (14) prevents symmetrical broadband over power line (BPL or PLC) signals from being attenuated and reduces the asymmetrical RFI flowing into one outlet. Therefore the modems can function effectively even when there is an over current and over voltage incident. Meanwhile the EMI filter (15) prevents the noise generated by the connected equipment from being injected into the power line. To cope with these, the two input means are connected with two sets of choke coils (16, 17) which in a case where a toroidal magnetic core is used for a magnetic core, a first set of choke coils (16) is arranged in-phase which will together present high impedance to prevent attenuation of symmetrical high frequencies of BPL or PLC data signals and provide low impedance to asymmetrical RFI noise to be attenuated at the low pass L-C filter (14) between the two coils where the selection of L (coil) and C (capacitor) values depend on the needs.

In order to avoid having to replace the current limiting components (18) too often due to non-damaging surges of short durations, a clamping element (16) may be added in between electrical energy supply connections of the live and neutral terminals as well as between the neutral terminal and earth ground. The clamping element (16) may be a varistor, preferably the metal oxide varistor (MOV). Therefore when an over-voltage occurs in relation to ground or between inputs, the clamping element (16) will absorb the excess voltage.

The interface protection circuit (10) is further connected to a second set of choke coils (17) which is arranged out-of-phase on the toroidal core together with the L-C filter network, allows both symmetrical and asymmetrical RFI, generated by the connected equipment to be attenuated and not injected into the power lines.

The grounding means (12) which is an alternative semi-floating equipment ground means (12) is connected to the interface protection circuit (10) to reduce the total leakage current of the connected equipment from flowing into the earth ground to a negligible level and it will keep the leakage current level below the trip threshold current of ELCB and making it to trip less frequently as nuisance tripping but allows earth fault currents to correctly trip the ELCB and RCD, bearing in mind that leakage via human body does not drain through the earth-wire but directly to ambient-ground. The semi-floating equipment ground means (12) is connected at the earth ground. The filter capacitors are connected to the semi-floating equipment ground means (12) to allow little leakage current as possible.

A voltage immunity means (20) is employed to the semi-floating equipment ground means (12), which having suitable value such as but not limited to 20V which would easily blow open circuit between the normal earth ground means and the semi-floating equipment ground means (12). The suitable value of the voltage immunity means (20) is determined by being as high as possible that does not endanger the user and will not interrupt the normal functions of the ELCB or RCD or RCCB. A preferable range of immunity of 20V to 50V is introduced between the connection points (21) of the earth ground.

The present arrangement and selection of components makes the total leakage current to earth ground of the connected equipment to a negligible level and virtually impossible to damage any equipment protected by the present invention. It has effectively brought the trip threshold of ELCB or RCCB or RCD to be further away from otherwise would-be leakage current level and therefore reduces the incidences of nuisance tripping. An optional detection circuit (13) connected to the semi-floating equipment ground means (12) as shown in FIG. 1 can be added to provide warning to the user when an earth fault is present but where the ELCB has failed to trip.

As will be readily apparent to those skilled in the art, the present invention may easily be produced in other specific forms without departing from its essential characteristics. The present embodiments is, therefore, to be considered as merely illustrative and not restrictive, the scope of the invention being indicated by the claims rather than the foregoing description, and all changes which come within therefore intended to be embraced therein.

The invention claimed is:

1. An electrical interface protecting means for protecting electrical equipment from a power surge and a lightning event, comprising:
    a first current limiting component connected in series to a first input means and coupled to a first output means;
    a second current limiting component connected in series to a second input means and coupled to a second output means;
    a first filter circuit connected to said first and second current limiting components, that reduces electrical noise interference without attenuating a symmetrical signal impressed on said first and second input means; and
    a second filter circuit connected to said first and second output means, that filters an electrical noise interference impressed on said first and second outputs from propagating through said second filter, wherein said first filter circuit is a low pass filter and said low pass filter comprises a set of choke coils arranged in-phase on a magnetic core to prevent attenuation of symmetrical high frequencies and allow attenuation of asymmetrical radio frequency interference noise.

2. An electrical interface protecting means for protecting electrical equipment from a power surge and a lightning event, comprising:
    a first current limiting component connected in series to a first input means and coupled to a first output means;
    a second current limiting component connected in series to a second input means and coupled to a second output means;
    a first filter circuit connected to said first and second current limiting components, that reduces an electrical noise interference without attenuating a signal impressed on said first and second input means;
    a second filter circuit connected to said first and second output means, that filters an electrical noise interference impressed on said first and second outputs from propagating through said second filter; and
    a semi-floating equipment ground means connected in series between a third input means and a third output means, that reduces an equipment leakage current flowing between said third input means and said third output means.

3. The electrical interface protecting means as in claim 2, wherein said third input means is earth ground and said semi-floating equipment ground means keeps said equipment leakage current below a trip threshold current of an earth leakage circuit breaker.

4. The electrical interface protecting means as in claim 3, wherein said semi-floating equipment ground means comprises a voltage immunity means having a suitable voltage value which blows open circuit when an over voltage is present between said earth ground and said third output means.

5. The electrical interface protecting means as in claim 1, wherein said first and second input means receive an electrical input from at least one of telecommunication lines and data lines.

6. The electrical interface protecting means as in claim 1, wherein said first and second input means receive an electrical energy supply.

7. The electrical interface protecting means as in claim 6, wherein said first input means is a live line terminal that provides a power line connection.

8. The electrical interface protecting means as in claim 6, wherein said second input means is a neutral line terminal that provides a neutral line connection.

9. The electrical interface protecting means as in claim 1, wherein said second filter circuit is an electromagnetic interference filter.

10. An electrical interface protecting means for protecting electrical equipment from a power surge and a lightning event, comprising:
   a first current limiting component connected in series to a first input means and coupled to a first output means;
   a second current limiting component connected in series to a second input means and coupled to a second output means;
   a first filter circuit connected to said first and second current limiting components, that reduces an electrical noise interference without attenuating a signal impressed on said first and second input means;
   an electromagnetic interference filter connected to said first and second output means, comprising a set of choke coils arranged out-of-phase on a magnetic core to attenuate both a symmetrical and an asymmetrical RFI impressed on said first and second outputs and filter both said RFI from propagating through said second filter.

11. The electrical interface protecting means as in claim 3, wherein said semi-floating equipment ground means comprises a detection circuit to provide a warning to a user when an earth fault is present on said third output but said earth leakage circuit breaker has failed to trip.

12. The electrical interface protecting means as in claim 1, further comprising at least one first clamping means for absorbing excess voltage occurrences, connected to said first and second filter circuits, and coupled to said first and second output means.

13. The electrical interface protecting means as in claim 12, further comprising at least one second clamping means for absorbing excess voltage occurrences, coupled to said second output means through said second filter circuit, coupled to said second input means through said first filter circuit, and connected to said third input means.

14. The electrical interface protecting means as in claim 13, wherein said clamping means is a metal oxide varistor.

* * * * *